(12) United States Patent
Luo et al.

(10) Patent No.: US 10,691,256 B2
(45) Date of Patent: Jun. 23, 2020

(54) TOUCH SUBSTRATE AND TOUCH DEVICE WITH REDUCED NUMBER OF SIGNAL LINES

(71) Applicants: BOE Technology Group Co., Ltd., Beijing (CN); Chengdu BOE Optoelectronics Technology Co., Ltd., Chengdu, Sichuan (CN)

(72) Inventors: Hongqiang Luo, Beijing (CN); Jianjun Wu, Beijing (CN); Yue Teng, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 26 days.

(21) Appl. No.: 16/210,024

(22) Filed: Dec. 5, 2018

(65) Prior Publication Data
US 2019/0204950 A1 Jul. 4, 2019

(30) Foreign Application Priority Data

Jan. 4, 2018 (CN) .......................... 2018 1 0008099

(51) Int. Cl.
*G06F 3/044* (2006.01)
*G06F 3/041* (2006.01)
*G06F 3/047* (2006.01)

(52) U.S. Cl.
CPC .......... *G06F 3/04164* (2019.05); *G06F 3/044* (2013.01); *G06F 3/047* (2013.01); *G06F 3/0416* (2013.01); *G06F 3/0445* (2019.05); *G06F 3/0446* (2019.05); *G06F 3/04166* (2019.05); *G06F 3/0412* (2013.01)

(58) Field of Classification Search
CPC ...... G06F 3/044; G06F 3/0446; G06F 3/0416; G06F 3/0412; G06F 3/041; G06F 3/04164; G06F 3/04166; G06F 3/04186; G06F 3/047; G02F 1/13338
See application file for complete search history.

(56) References Cited

U.S. PATENT DOCUMENTS 10,534,486 B2 * 1/2020 Na ...................... G02F 1/13338

* cited by examiner

*Primary Examiner* — Laurence J Lee
(74) *Attorney, Agent, or Firm* — Nath, Goldberg & Meyer; Joshua B. Goldberg (57) ABSTRACT

Provided is a touch substrate and touch device including a touch region, wherein the touch region is provided with a plurality of first and second electrodes arranged in a perpendicular direction. The first electrodes are grouped and electrically coupled within the same group. The second electrodes are grouped, with individual elements interleaved and insulated, in order to minimize the overall number of signal lines, thus allowing for a reduced border width.

15 Claims, 5 Drawing Sheets

TOUCH SUBSTRATE AND TOUCH DEVICE WITH REDUCED NUMBER OF SIGNAL LINES

CROSS-REFERENCE TO RELATED APPLICATIONS

The present disclosure claims the priority of Chinese Patent Application No. 201810008099.8, filed on Jan. 4, 2018, the content of which is incorporated herein by reference in its entirety.

TECHNICAL FIELD

The present application relates to the field of touch technology, and in particular, to a touch substrate and a touch device.

BACKGROUND

A plurality of touch driving electrodes and a plurality of touch sensing electrodes are provided in a touch region of a touch substrate. Each of the touch driving electrodes and each of the touch sensing electrodes are electrically coupled to a bonding region, and the driving circuit board is electrically coupled to the bonding region, so that the driving circuit board is electrically coupled to each of the touch driving electrodes and each of the touch sensing electrodes, and thereby driving the touch substrate.

SUMMARY

According to an aspect of the disclosure, a touch substrate with touch region is provided. The touch region is provided with: a plurality of first electrodes arranged in a first direction, wherein each of the plurality of first electrodes extends in a second direction perpendicular to the first direction, the plurality of first electrodes are dividing into a plurality of groups of first electrodes, each group of the groups of first electrodes includes at least two first electrodes arranged sequentially, and the at least two first electrodes of each group of first electrodes are electrically coupled to each other; and a plurality of groups of second electrodes arranged in the second direction, wherein each group of the plurality of groups of second electrodes includes at least two second electrodes insulated from each other, each of the at least two second electrodes includes a plurality of electrode units electrically coupled to each other, electrode units of a second electrode of each group of second electrodes are alternately arranged with electrode units of another second electrode of each group of second electrodes along the first direction, each first electrode and each second electrode are insulated from each other; each of the plurality of first electrodes is overlapped with a plurality of electrode units of the plurality of groups of second electrodes in a same row as the first electrode, and any two of all electrode units overlapped with the at least two first electrodes of each group of first electrodes are located in different second electrodes.

In an embodiment, a number of first electrodes in each group of first electrodes is the same as a number of second electrodes in each group of second electrodes.

In an embodiment, each group of first electrodes includes two first electrodes, and each group of second electrodes includes two second electrodes.

In an embodiment, odd-numbered electrode units that are arranged in the first direction are electrically coupled in sequence so as to form one of the two second electrodes; and even-numbered electrode units that are arranged in the first direction are electrically coupled in sequence so as to form the other of the two second electrodes.

In an embodiment, the touch substrate further includes a first edge region and a second edge region, wherein the first edge region and the second edge region are located outside the touch region and adjacent to the touch region, and the first edge region and the second edge region are arranged on opposite sides of the touch region along the first direction; a third edge region and a fourth edge region, wherein the third edge region and the fourth edge region are located outside the touch region and adjacent to the touch region, and the third edge region and the fourth edge regions are arranged on opposite sides of the touch region along the second direction; a bonding region, located in the first edge region, wherein the bonding region is provided with a plurality of first conductive portions and a plurality of second conductive portions, each of the plurality of first conductive portions corresponds to a corresponding group of the plurality of groups of first electrodes, and each of the plurality of second conductive portions corresponds to one second electrode of a corresponding group of the groups of second electrodes; a plurality of first signal lines, wherein each group of first electrodes is electrically coupled to a corresponding one of the plurality of first conductive portions via one of the plurality of first signal lines; and a plurality of second signal lines, wherein each second electrode is electrically coupled to a corresponding one of the plurality of second conductive portions via one of the plurality of second signal lines.

In an embodiment, the at least two first electrodes of each group of first electrodes are electrically coupled via a first connecting line, each group of first electrodes is electrically coupled to a first signal line via the first connecting line, and the plurality of electrode units of each group of second electrodes are sequentially electrically coupled via a second connecting line.

In an embodiment, a part of the plurality of first signal lines are disposed in the third edge region; and remaining signal lines of the plurality of first signal lines are disposed in the fourth region.

In an embodiment, a number of the part of the plurality of first signal lines is equal to a number of remaining signal lines.

In an embodiment, each of the plurality of first electrodes is a touch sensing electrode, and each of the plurality of electrode units is a touch driving electrode.

In an embodiment, the touch substrate has a rectangular shape, the first direction is defined as a length direction of the touch substrate, and the second direction is defined as a width direction of the touch substrate.

In an embodiment, each of the plurality of electrode units and each of the plurality of first electrodes are made of indium tin oxide, the first connecting line is a metal wire, and the second connecting line is a metal wire, and second connecting line is formed in synchronization with the plurality of electrode units.

According to an aspect of the disclosure, a touch device including the touch substrate described above is provided.

In an embodiment, the touch device further includes a driving circuit board, and each of the plurality of first conductive portions and each of the plurality of second conductive portions are electrically coupled to the driving circuit board.

BRIEF DESCRIPTION OF THE DRAWINGS

The drawings, which constitute a part of the specification, are provided for a further understanding of the disclosure.

The drawings together with the following implementations are used for explanation of the disclosure, but not a limitation of the disclosure. In the drawings.

DETAILED DESCRIPTION

Specific implementations of the present disclosure will be described in detail below with reference to accompanying drawings. It is to be understood that the specific implementations merely intend to illustrate and explain the present disclosure, and do not intend to limit the disclosure.

Figure 1:
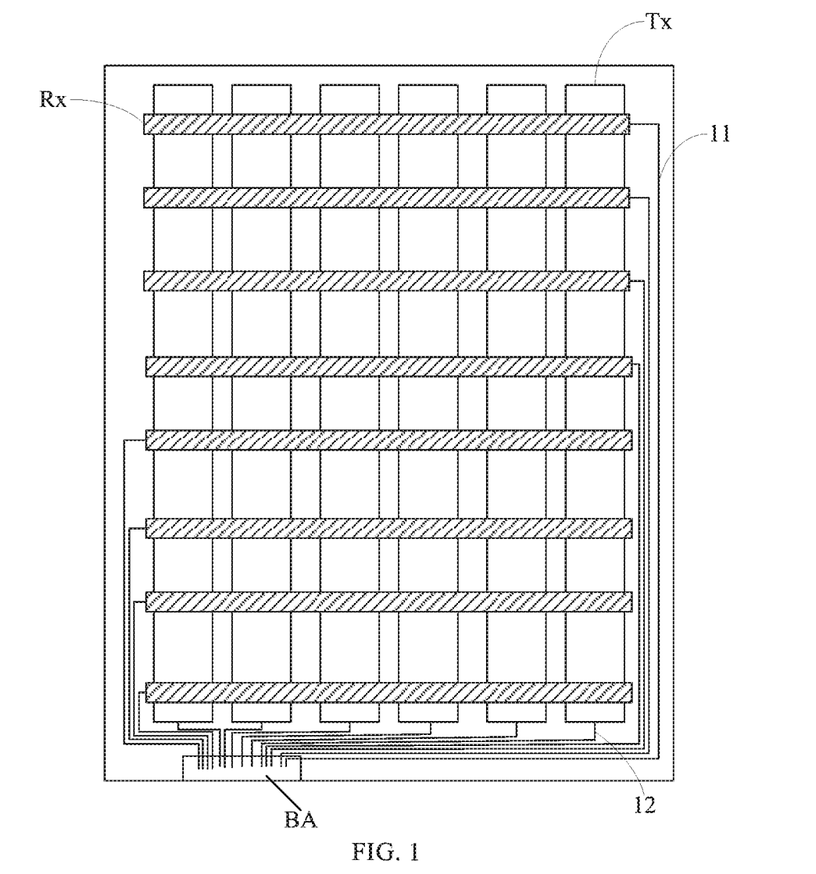
FIG. 1 is a schematic diagram of a structure of a touch substrate.

FIG. 1 is a schematic diagram of a structure of a touch substrate. As shown in FIG. 1, a touch region of the touch substrate is provided with a plurality of touch driving electrodes Tx and a plurality of touch sensing electrodes Rx. Each of the touch sensing electrodes Rx is electrically coupled to the bonding region BA via a corresponding one of a plurality of first signal lines 11. Each of the touch driving electrodes Tx is electrically coupled to the bonding region BA via a corresponding second signal line 12 of a plurality of second signal lines 12. A driving circuit board (not shown) is electrically coupled to the bonding region BA, so that the driving circuit board is electrically coupled to each of the touch driving electrodes Tx and each of the touch sensing electrodes Rx, thereby driving the touch substrate. However, since there are a large number of first signal lines 11 as shown in FIG. 1, the touch region has a relatively large width on each of left and right sides, which is not conducive to the realization of the narrow border.

Figure 2:
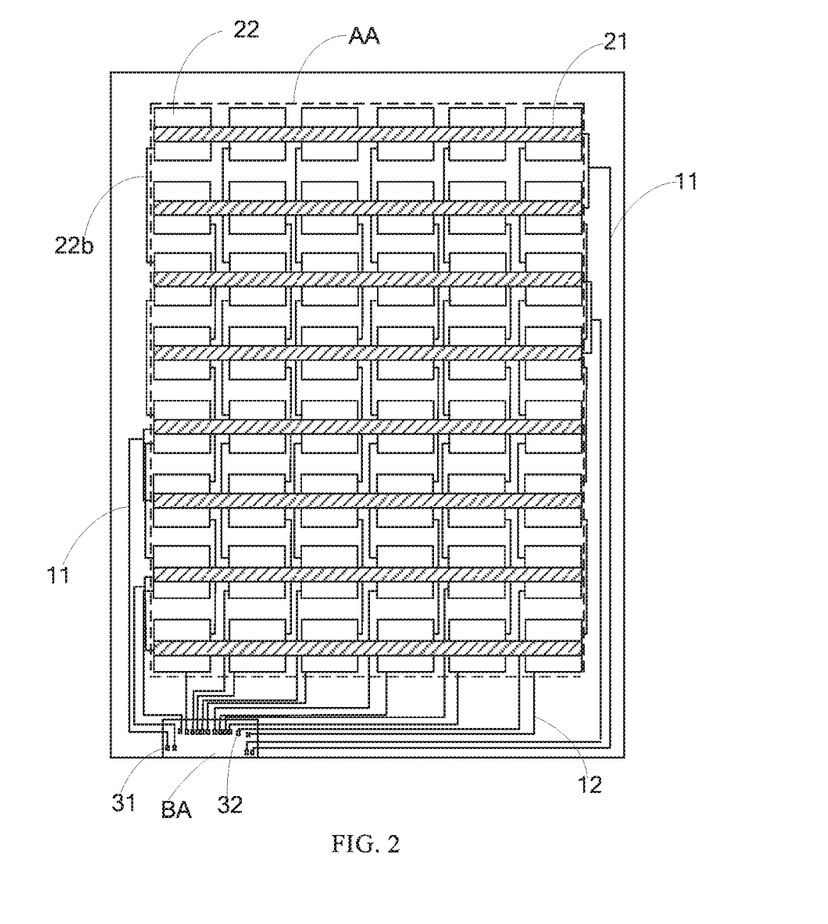
FIG. 2 is a schematic diagram of a touch substrate according to an embodiment of the present disclosure.
Figure 3:
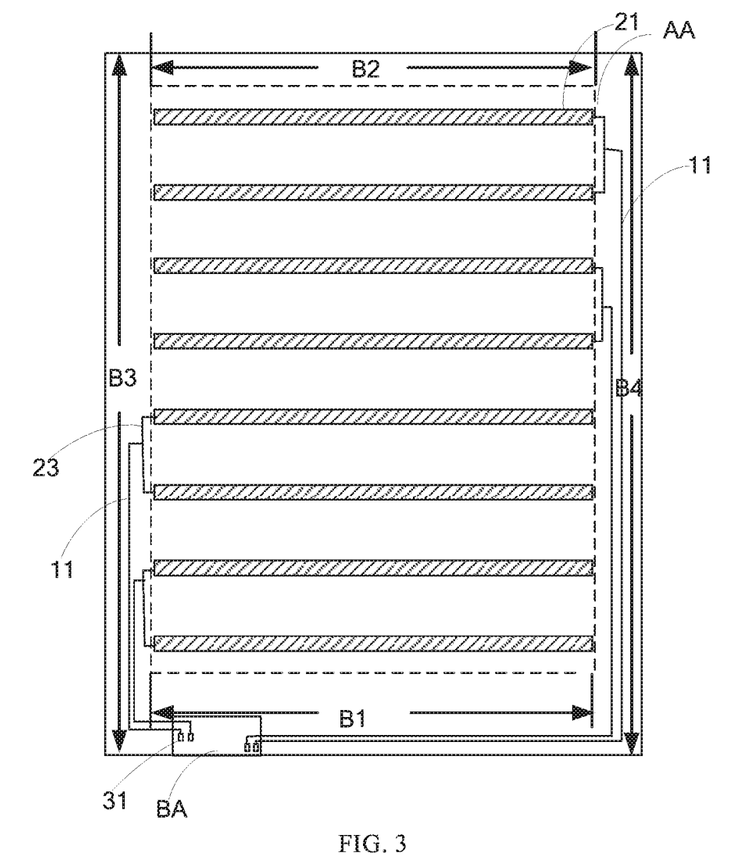
FIG. 3 is a schematic diagram of a connection between first electrodes and a bonding region in a touch substrate according to an embodiment of the present disclosure.
Figure 4:
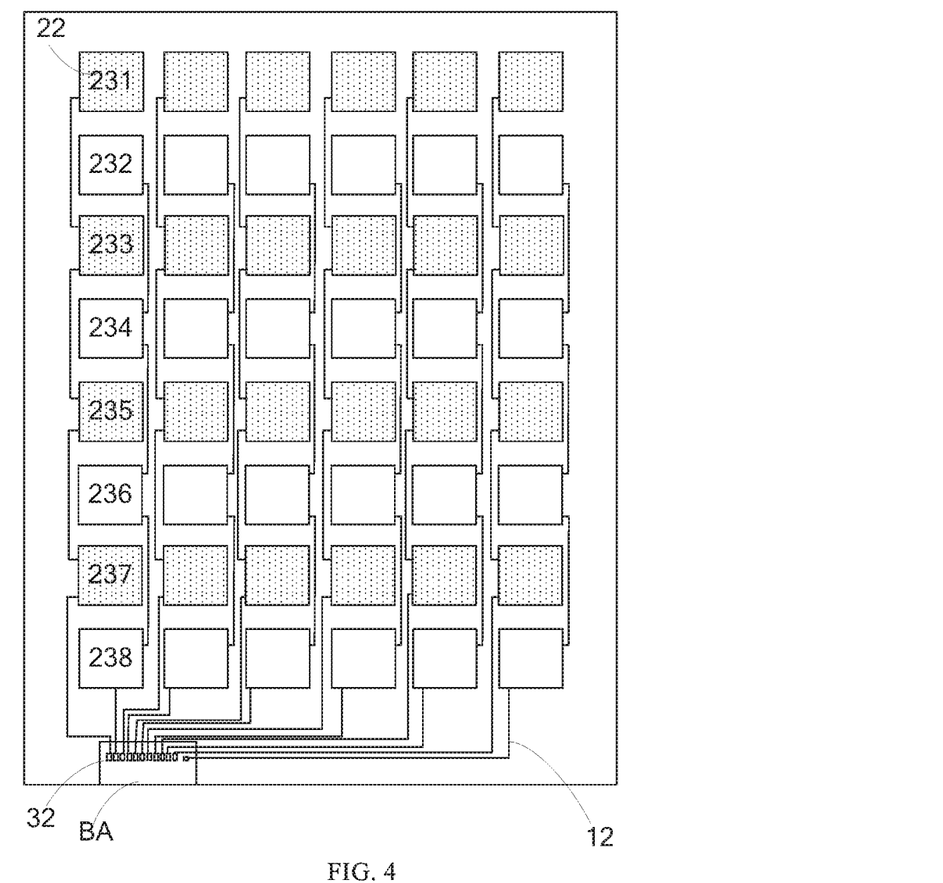
FIG. 4 is a schematic diagram of a connection between second electrodes and a bonding region in a touch substrate according to an embodiment of the present disclosure.
Figure 5A:
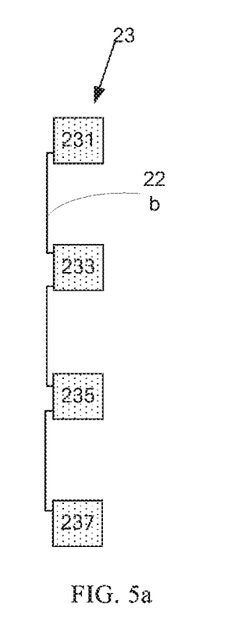
FIGS. 5a and 5b are schematic diagrams showing structures of two second electrodes in each group of second electrodes, respectively.
Figure 5B:
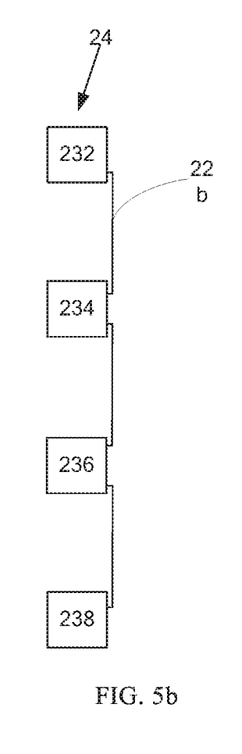

In order to reduce the border widths of the touch region on the left and right sides, the present disclosure provides a touch substrate. FIG. 2 is a schematic diagram of a touch substrate according to an embodiment of the present disclosure, FIG. 3 is a schematic diagram of a connection between a plurality of first electrodes and a bonding region in the touch substrate; FIG. 4 is a schematic diagram of a connection between a plurality of second electrodes and a bonding region in the touch substrate; and FIG. 5a and FIG. 5b are schematic diagrams showing structures of two second electrodes in each group of second electrodes, respectively. As shown in FIG. 2 to FIG. 5b, the touch substrate includes a touch region AA, the first edge region B1, the second edge region B2, the third edge region B3, and the fourth edge region B4. The first edge region B1 and the second edge region B2 are located outside the touch region and adjacent to the touch region, and the first edge region B1 and the second edge region B2 are arranged on opposite sides of the touch region AA along the first direction. The third edge region B3 and the fourth edge region B4 are located outside the touch region AA and adjacent to the touch region AA, and the third edge region B3 and the fourth edge region B4 are arranged on opposite sides of the touch region AA along the second direction. The touch region AA is provided with a plurality of first electrodes 21 arranged along a first direction, and each of the first electrodes 21 extends along a second direction perpendicular to the first direction. The plurality of first electrodes 21 are divided into a plurality of groups of first electrodes, each group of first electrodes may include at least two first electrodes 21 arranged sequentially in the first direction. The at least two first electrodes 21 in each group of first electrodes are electrically coupled to each other. As shown in FIG. 4, the touch region AA is further provided with a plurality of groups of second electrodes 22 arranged along the second direction.

As shown in FIG. 5a and FIG. 5b, each group of second electrodes, such as the group of second electrodes 22, includes at least two second electrodes (i.e., second electrodes 23 and 24) insulated and spaced apart from each other. The second electrode 23 includes a plurality of electrode units 231, 233, 235, 237 electrically coupled to each other, and the plurality of electrode units 231, 233, 235, 237 are arranged in the first direction. The second electrode 24 includes a plurality of electrode units 232, 234, 236, 238 electrically coupled to each other, and the plurality of electrode units 232, 234, 236, 238 are arranged in the first direction. As shown in FIG. 4, a plurality of electrode units 231, 233, 235, 237 of the second electrode 23 are alternately arranged with the plurality of electrode units 232, 234, 236, 238 of the second electrode 24 in the first direction. The arrangement of electrode units in each of the other groups of second electrodes is the same with the arrangement of the group of second electrodes 22 described above, and thus a detailed description thereof will be omitted.

In an embodiment, the group of second electrodes 22 includes two second electrodes 23 and 24. That is, odd-numbered electrode units 231, 233, 235 and 237 arranged in the first direction are electrically coupled in sequence so as to constitute the second electrodes 23. Even-numbered electrode units 232, 234, 236 and 238 arranged in the first direction are electrically coupled in sequence so as to constitute the second electrode 24. Each of the first electrodes 21 is insulated from each electrode unit in the second electrode.

As shown in FIG. 2, each of the first electrodes 21 is overlapped with a plurality of electrode units in a same row as the first electrode among the groups of second electrodes 22. Any two of all electrode units overlapped with the at least two first electrodes 21 of each group of first electrodes are located in different second electrodes. In other words, each of the electrode units is overlapped with a first electrode 21. For any two of the second electrodes 23 and 24 in each of the second electrodes 23 and 24, a first electrode 21 overlapped with an electrode unit 231 and a first electrodes 21 overlapped with another electrode unit 233 are located in different groups of first electrodes, respectively.

As shown in FIG. 2 to FIG. 4, the first direction may be defined as an up-down direction in FIGS. 2 to 4, and the second direction may be defined as a left-right direction in FIGS. 2 to 4. One of the first electrode 21 and the second electrode 22 in the present disclosure may be served as a touch sensing electrode, and the other of the first electrode 21 and the second electrode 22 may be served as a touch driving electrode. A capacitor is formed between each electrode unit and the first electrode 21 overlapped with the electrode unit.

As shown in FIG. 3, at least two first electrodes 21 are connected to each other to form a group of first electrodes 21. The at least two first electrodes 21 in the group of first electrodes may be connected via a first connecting line 23; alternatively, the first electrodes 21 in the group of first electrodes are formed as a whole. In a case where the bonding region BA is provided on one side of the touch region AA in the first direction (above or below the touch region AA in FIG. 2, or in the first edge region or the second edge region), since the first electrodes 21 in each group of first electrodes are connected with each other, each group of first electrodes 21 can be electrically coupled to the bonding region via one signal line 11 without setting one signal line for each of the first electrodes 21, thereby reducing the width occupied by the signal lines on an edge region (i.e., the third edge and the fourth edge) outside of the touch region AA. The first electrodes 21 in each group of first electrodes are connected via a first connecting line 23, and a plurality of first connecting lines 23 for the plurality of groups of first electrodes 21 may be arranged in a straight line, thereby occupying a width of merely one connecting line. Therefore, the widths of the edge regions (i.e., left and right edges, or the third edge and the fourth edge) of the touch region along the second direction can be reduced according to the present disclosure.

In addition, it can be understood by those skilled in the art that when a driving signal is received by anyone of the touch driving electrodes, sensing signals are generated by each of the touch sensing electrodes overlapped with the touch driving electrode, according to the principle of position detection of a touch point. As a touch operation occurs, the capacitance at the touch point changes. When the position detection of the touch point is performed, the driving signals are transmitted to the touch driving electrodes in a one by one manner through scan. As a sensing signal of the touch sensing electrode corresponding to the touch point changes, the touch position can be determined. According to the touch detection principle above, in the case where the first electrodes 21 in each group of first electrodes are electrically coupled with each other, if all the electrode units, such as the electrode units 231, 232, 233, 234, 235, 236, 237 and 238, in each group of second electrodes are electrically coupled with each other, it is cannot determined that which first electrode 21 the touch point corresponds to, so that the position of the touch point cannot be determined. In the present disclosure, since a plurality of electrode units, such as the electrode units 231, 232, 233, 234, 235, 236, 237 and 238, in each group of second electrodes 22 arranged in the first direction are divided into at least two second electrodes 23 and 24, and any two electrode units, such as the electrode units 231 and 232, of all the electrode units overlapped with the first electrodes 21 of a group of first electrodes are located in different second electrodes 23 and 24, respectively, therefore the position of the touch point in the second direction can be determined according to the position of a group of second electrodes 22 corresponding to the touch point. Further, the position of the touch point in the first direction can be determined according to the second electrodes 22 and a group of first electrodes 21 corresponding to the touch point. Therefore, the connection between the first electrodes 21 of each group of first electrodes does not affect the touch effect. Therefore, touch effect can be ensured, and the border width can be reduced according to the disclosure.

As shown in FIG. 2, the touch substrate further includes a bonding region BA located on a side of the touch region AA along the first direction, for example, located on a lower side of the touch region AA, i.e. in the first edge region. A plurality of first conductive portions 31 and a plurality of second conductive portions 32 are disposed in the bonding region BA. Each of the plurality of conductive portions 31 corresponds to a corresponding group of the plurality of groups of first electrodes 21. Each of the plurality of second conductive portions 32 corresponds to one of second electrodes 23 and 24 in each of the plurality of groups of second electrodes. A plurality of first signal lines 11 and a plurality of second signal lines 12 are provided on the touch substrate. As shown in FIG. 3, each group of first electrodes 21 is electrically coupled with a corresponding one of the plurality of first conductive portions 31 via one first signal line 11. Referring to FIG. 4, FIG. 5a and FIG. 5b, a plurality of electrode units 231, 233, 235 and 237 of the second electrode 23 of each group of second electrodes 22 are electrically coupled to a corresponding one of the plurality of second conductive portions 32 via one second signal line 12, and a plurality of electrode units 232, 234, 236 and 238 of the second electrodes 24 of each group of second electrodes 22 are electrically coupled to a corresponding one of the plurality of second conductive portions 32 via another second signal line 12.

In the present disclosure, a first electrode 21 may be or include a touch sensing electrode, and a second electrode 22 may be or include a touch driving electrode. Alternatively, a first electrode 21 may be or include a touch driving electrode, and a second electrode 22 may be or include a touch sensing electrode.

As described above, any two of the electrode units of all the electrode units overlapped with the first electrodes 21 in each group of first electrodes are located in different second electrodes, that is, a number of second electrodes in each group of second electrodes 22 is not less than a number of first electrodes in each group of first electrodes 21. Since the driving signals need to be supplied to the second electrodes 22 in a one by one manner when the position detection of the touch point is performed, the time for supplying the driving signals may be long if the total number of the second electrodes 22 is too large. In an embodiment, the number of the first electrodes in each group of first electrodes 21 is the same as the number of the second electrodes in each group of second electrode 22 of the group, in order to reduce the width of borders on the left and right sides of the touch region AA, and prevent the time for providing the driving signals from being too long so as to ensure the detection speed.

Further, as shown in FIG. 3, each group of first electrodes 21 includes two first electrodes 21; as shown in FIGS. 4, 5a and 5b, each group of second electrodes 22 includes two second electrodes 23 and 24. That is, among a plurality of electrode units arranged in the first direction, the odd-numbered electrode units 231, 233, 235 and 237 are electrically coupled with each other to form a second electrode 23; the even-numbered electrode unit 232, 234, 236 and 238 are electrically coupled with each other to form another second electrode 24. Therefore, the number of the first signal lines 11 in the disclosure is only half the number of signal lines in related art, thereby significantly reducing the area occupied by the first signal lines 11 on the border.

The first electrodes 21 of each group of first electrodes are electrically coupled to each other via a first connecting line 23, and each group of first electrodes 21 is electrically coupled to the first signal line 11 via the first connecting line 23. The electrode units 231, 232, 235 and 237 (or 232, 234, 236 and 238) in a group of second electrodes 23 (or 24) are electrically coupled in sequence via a second connecting line 22b.

The touch substrate can be applied to a touch display device. In this case, the touch region AA is formed as a display region. In order to ensure the light transmission effect of the display region, each of first electrodes and each of the plurality of electrode units of the second electrodes may be made of a transparent conductive material such as indium tin oxide (ITO). The first connecting line 23 may be a metal line. The second connecting line 22b may be a transparent structure formed in synchronization with the electrode units, or may be a metal line.

In order to reduce the difference in width of the borders on the left and right sides of the touch region AA, as shown in FIG. 2 and FIG. 3, some or a part of the first signal lines 11 are provided on the left side of the touch region AA along the second direction, i.e., in the third edge region, and the remaining first signal lines of the first signal lines 11 are provided on the right side of the touch region AA along the second direction, i.e., in the fourth edge region.

Further, a number of the first signal lines on the left side of the touch region is equal to a number of the first signal lines on the right side of the touch region, thereby facilitating further reduction of the difference in width of the borders on the left and right sides.

In the present disclosure, the touch substrate may have a rectangular shape. The first direction is defined as a length direction of the touch substrate (i.e., the extending direction of the rectangular' long side), and the second direction is defined as a width direction of the touch substrate (i.e., the extending direction of the rectangle' short side). As such, when the touch substrate is applied in a mobile phone, the widths of the borders on the left and right sides of the phone are reduced, thereby improving user experience. When the touch substrate has a square shape, the first direction and the second direction are extending directions of two adjacent sides of the square, respectively.

As another aspect of the present disclosure, a touch device is provided, the touch device includes the touch substrate described above.

The touch substrate can reduce the number of signal lines in the edge regions with the touch function ensured. Therefore, the touch device with the touch substrate can realize narrow border with the touch function ensured.

The touch device further includes a driving circuit board (not shown) electrically coupled to the bonding region BA of the touch substrate, that is, each of the plurality of first conductive portions 31 and each of the plurality of second conductive portions 32 are electrically coupled to the driving circuit board, respectively, so that the driving circuit board provides driving signals for the second electrodes 22 in a one by one manner, and detects the sensing signals generated on each group of first electrodes 21, thereby determining the touch position according to the sensing signals.

The driving circuit board can be electrically coupled to the plurality of first conductive portions and the plurality of second conductive portions in the bonding region BA through an Anisotropic Conductive Film (ACF).

In addition, the touch device may be a touch display device including a display panel, thereby implementing touch function while displaying.

It should be understood that the above implementations are merely exemplary embodiments for the purpose of illustrating the principles of the disclosure, however, the present disclosure is not limited thereto. It will be apparent to those skilled in the art that various changes and modifications can be made without departing from the spirit and spirit of the present disclosure, which are also to be regarded as within the scope of the present disclosure.

What is claimed is:

1. A touch substrate, comprising:
  a touch region, wherein the touch region is provided with:
    a plurality of first electrodes arranged in a first direction, wherein each of the plurality of first electrodes extends in a second direction perpendicular to the first direction, the plurality of first electrodes are divided into a plurality of groups of first electrodes, each group of the groups of first electrodes comprises at least two first electrodes arranged sequentially, and the at least two first electrodes of each group of first electrodes are electrically coupled to each other; and
    a plurality of groups of second electrodes arranged in the second direction, wherein each group of the plurality of groups of second electrodes comprises at least two second electrodes insulated from each other, each of the at least two second electrodes comprises a plurality of electrode units electrically coupled to each other, electrode units of a second electrode of each group of second electrodes are alternately arranged with electrode units of another second electrode of each group of second electrodes along the first direction, each first electrode and each second electrode are insulated from each other;
  wherein
    each of the plurality of first electrodes is overlapped with a plurality of electrode units of the plurality of groups of second electrodes in a same row as the first electrode, and
    any two of all electrode units overlapped with the at least two first electrodes of each group of first electrodes are located in different second electrodes.

2. The touch substrate according to claim 1, wherein a number of first electrodes in each group of first electrodes is the same as a number of second electrodes in each group of second electrodes.

3. A touch device comprising the touch substrate of claim 2.

4. The touch substrate according to claim 1, wherein
  each group of first electrodes comprises two first electrodes, and
  each group of second electrodes comprises two second electrodes.

5. The touch substrate according to claim 4, wherein
  odd-numbered electrode units that are arranged in the first direction are electrically coupled in sequence so as to form one of the two second electrodes; and
  even-numbered electrode units that are arranged in the first direction are electrically coupled in sequence so as to form the other of the two second electrodes.

6. A touch device comprising the touch substrate of claim 4.

7. The touch substrate according to claim 1, further comprising:
  a first edge region and a second edge region, wherein the first edge region and the second edge region are located outside the touch region and adjacent to the touch region, and the first edge region and the second edge region are arranged on opposite sides of the touch region along the first direction;
  a third edge region and a fourth edge region, wherein the third edge region and the fourth edge region are located outside the touch region and adjacent to the touch region, and the third edge region and the fourth edge regions are arranged on opposite sides of the touch region along the second direction;
  a bonding region, located in the first edge region, wherein the bonding region is provided with a plurality of first conductive portions and a plurality of second conductive portions, each of the plurality of first conductive portions corresponds to a corresponding group of the plurality of groups of first electrodes, and each of the plurality of second conductive portions corresponds to one second electrode of a corresponding group of the groups of second electrodes;

a plurality of first signal lines, wherein each group of first electrodes is electrically coupled to a corresponding one of the plurality of first conductive portions via one of the plurality of first signal lines; and a plurality of second signal lines, wherein each second electrode is electrically coupled to a corresponding one of the plurality of second conductive portions via one of the plurality of second signal lines.

8. The touch substrate according to claim 7, wherein the at least two first electrodes of each group of first electrodes are electrically coupled via a first connecting line, each group of first electrodes is electrically coupled to a first signal line via the first connecting line, and the plurality of electrode units of each group of second electrodes are sequentially electrically coupled via a second connecting line.

9. The touch substrate according to claim 7, wherein a part of the plurality of first signal lines are disposed in the third edge region; and remaining signal lines of the plurality of first signal lines are disposed in the fourth region.

10. The touch substrate according to claim 9, wherein a number of the part of the plurality of first signal lines is equal to a number of the remaining signal lines.

11. The touch substrate according to claim 10, wherein each of the plurality of first electrodes is a touch sensing electrode, and each of the plurality of electrode units is a touch driving electrode.

12. The touch substrate according to claim 11, wherein the touch substrate has a rectangular shape, the first direction is defined as a length direction of the touch substrate, and the second direction is defined as a width direction of the touch substrate.

13. The touch substrate according to claim 12, wherein each of the plurality of electrode units and each of the plurality of first electrodes are made of indium tin oxide, the first connecting line is a metal wire, and the second connecting line is a metal wire, and second connecting line is formed in synchronization with the plurality of electrode units.

14. A touch device comprising the touch substrate of claim 7, wherein the touch device further comprises a driving circuit board, and each of the plurality of first conductive portions and each of the plurality of second conductive portions are electrically coupled to the driving circuit board.

15. A touch device comprising the touch substrate of claim 1.

* * * * *